(12) United States Patent
Shiozaki et al.

(10) Patent No.: US 10,590,974 B2
(45) Date of Patent: Mar. 17, 2020

(54) LAP FILLET ARC-WELDED JOINT

(71) Applicant: JFE Steel Corporation, Tokyo (JP)

(72) Inventors: Tsuyoshi Shiozaki, Tokyo (JP); Yuichi Tokita, Tokyo (JP); Yoshikiyo Tamai, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 203 days.

(21) Appl. No.: 15/547,256

(22) PCT Filed: Jan. 27, 2016

(86) PCT No.: PCT/JP2016/052254
§ 371 (c)(1),
(2) Date: Jul. 28, 2017

(87) PCT Pub. No.: WO2016/129388
PCT Pub. Date: Aug. 18, 2016

(65) Prior Publication Data
US 2018/0274575 A1 Sep. 27, 2018

(30) Foreign Application Priority Data

Feb. 12, 2015 (JP) .................................. 2015-025551

(51) Int. Cl.
*F16B 5/08* (2006.01)
*B23K 9/02* (2006.01)
(Continued)

(52) U.S. Cl.
CPC ................ *F16B 5/08* (2013.01); *B23K 9/025* (2013.01); *B23K 9/028* (2013.01); *B23K 33/004* (2013.01);
(Continued)

(58) Field of Classification Search
CPC ...... B23K 9/05; B23K 33/004; B23K 33/008; B23K 9/02; F16B 5/08; Y10T 403/478; Y10T 403/479; Y10T 403/477
See application file for complete search history.

(56) References Cited

U.S. PATENT DOCUMENTS

| | | |
|---|---|---|
| 5,476,210 A | 12/1995 | Hodozuka et al. |
| 5,645,364 A | 7/1997 | Hodozuka et al. |
| 10,010,963 B2 | 7/2018 | Tsuji et al. |

FOREIGN PATENT DOCUMENTS

| | | |
|---|---|---|
| CN | 2533341 Y | 1/2003 |
| CN | 203528226 U | 4/2014 |

(Continued)

OTHER PUBLICATIONS

Chinese Office Action dated Nov. 30, 2018, of counterpart Chinese Application No. 20168009319.8, along with a Search Report in English.

(Continued)

*Primary Examiner* — Michael P Ferguson
(74) *Attorney, Agent, or Firm* — DLA Piper LLP (US)

(57) ABSTRACT

A lap fillet arc-welded joint produced by overlapping two metal sheets and welding an end portion of one sheet of the two metal sheets to a surface of the other sheet along the end portion of the one sheet includes a protruding curved potion being bead-shaped and protruding from the surface of the other sheet; and a weld toe positioned on a top portion of the protruding curved portion.

1 Claim, 6 Drawing Sheets

(51) Int. Cl.
  *B23K 9/028* (2006.01)
  *B23K 33/00* (2006.01)
  *B23K 9/025* (2006.01)
  *B23K 101/28* (2006.01)
  *B23K 101/18* (2006.01)
  *B23K 101/06* (2006.01)

(52) U.S. Cl.
  CPC ...... *B23K 2101/06* (2018.08); *B23K 2101/18* (2018.08); *B23K 2101/28* (2018.08)

(56) References Cited

FOREIGN PATENT DOCUMENTS

| CN | 104748582 A | | 7/2015 | |
| DE | 417167 | | 8/1925 | |
| DE | 199 26 796 A1 | | 12/2000 | |
| DE | 199 32 415 C1 | | 2/2001 | |
| GB | 2 114 489 | * | 8/1983 | ............. B23K 33/00 |
| JP | 62-296969 | * | 12/1987 | ............. B23K 9/225 |
| JP | 63-2585 A | | 1/1988 | |
| JP | S63-5873 | | 1/1988 | |
| JP | 06-75794 B2 | | 9/1994 | |
| JP | 07-9135 A | | 1/1995 | |
| JP | 10-193164 A | | 7/1998 | |
| JP | 2001-047231 A | | 2/2001 | |
| JP | 2001-293562 A | | 10/2001 | |
| JP | 2003-033872 | | 2/2003 | |
| JP | 2008-221300 A | | 9/2008 | |
| JP | 2010-228698 | | 10/2010 | |
| JP | 2012-213803 A | | 11/2012 | |
| JP | 2014-004607 A | | 1/2014 | |
| WO | WO 02/060614 | * | 8/2002 | ............. B23K 33/00 |

OTHER PUBLICATIONS

Korean Office Action dated Jul. 16, 2018, of counterpart KR Application No. 10-2017-7024018, with Concise Statement of Relevance of Office Action in English.

Supplementary European Search Report dated Jul. 31, 2018, of counterpart EP Application No. 16749033.3.

* cited by examiner

FIG.1
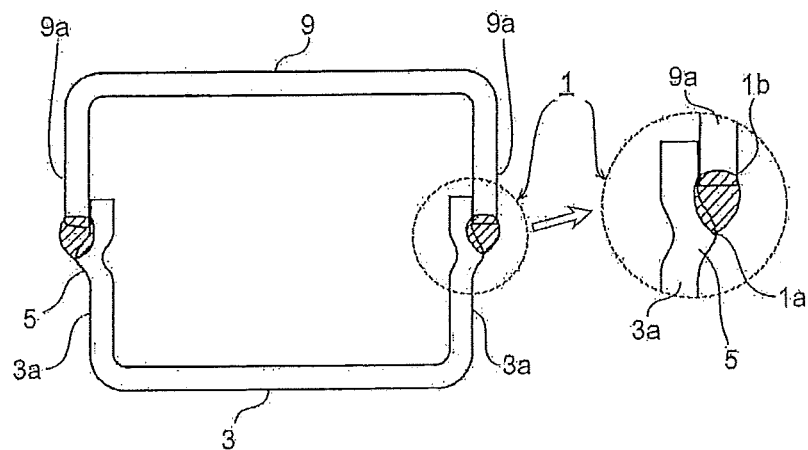
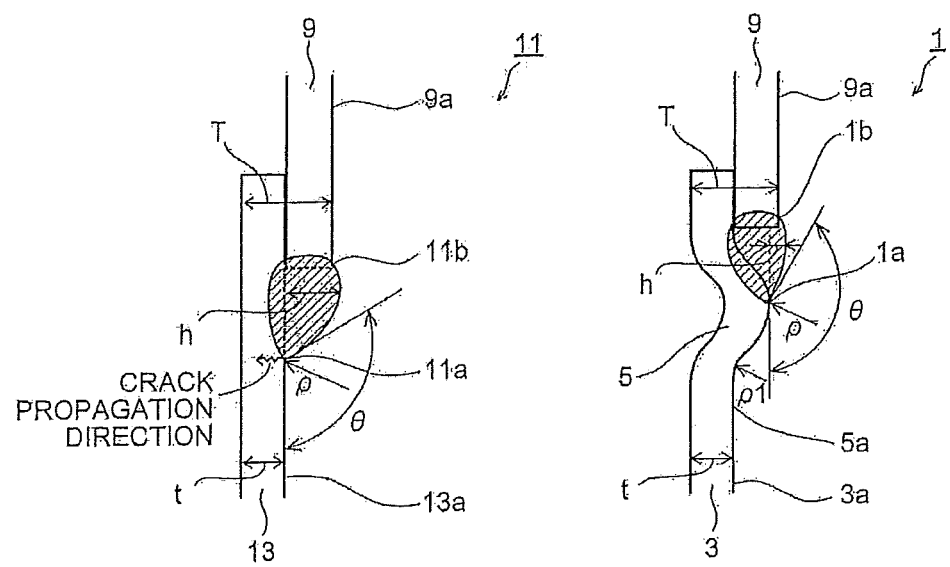
FIG. 2 (A)
Prior Art
FIG. 2 (B)

LAP FILLET ARC-WELDED JOINT

TECHNICAL FIELD

This disclosure is directed to a lap fillet arc-welded joint for a sheet metal welded structure such as an automotive part.

BACKGROUND

Weight reduction of automotive bodies is desired in recent years in the automobile industry from the viewpoint of preventing global warming. For instance, applying high-strength steel sheet to chassis frame parts and suspension parts can lead to thickness reduction of steel sheets and thereby contribute to weight reduction of a full vehicle.

Many of chassis frame parts and suspension parts are joined by arc welding. Welding two parts is often performed by adopting lap fillet arc welding that welds an end portion of one part of the two parts to a surface of the other part along the end portion of the one part.

In a durability test conducted on two parts fillet-welded by arc welding, a weld toe of a weld bead is a portion where cracking is prone to occur. Studies to increase fatigue strength of the weld toe have conventionally been made through various approaches including causing the weld toe to have a multilayer structure (see Japanese Laid-Open Patent Publication No. 2014-4607), studying shielding gas constituents (see Japanese Laid-Open Patent Publication No. 2012-213803), and removing a residual stress around a welded portion (see Japanese Laid-Open Patent Publication No. 10-193164). However, because those techniques increase cost due to an increase in the man-hours to weld or a need for a special gas, there is currently no means available to inexpensively increase fatigue strength without increasing the man-hours.

It could therefore be helpful to provide a lap fillet arc-welded joint that, when applied to two metal sheets to be overlapped and lap fillet welded by arc welding, exhibits favorable fatigue strength without increasing cost or the man-hours.

SUMMARY

We thus provide a lap fillet arc-welded joint produced by overlapping two metal sheets and welding an end portion of one sheet of the two metal sheets to a surface of the other sheet along the end portion of the one sheet including: a protruding curved portion, the protruding curved portion being bead-like and protruding from the surface of the other sheet; and a weld toe positioned on a top portion of the protruding curved portion.

Moreover, in the lap fillet arc-welded joint, the top portion is flat.

Moreover, in the lap fillet arc-welded joint, the radius of curvature of a rising portion of the protruding curved portion, the rising portion being on a not-welded side of the protruding curved portion, is greater than or equal to 0.8 mm.

Moreover, in the lap fillet arc-welded joint produced by overlapping two metal sheets and welding an end portion of one sheet of the two metal sheets to a surface of the other sheet along the end portion of the one sheet includes: a protruding curved portion, the protruding curved portion being bead-like and protruding from the surface of the other sheet; and a weld toe positioned on a sloped portion of the protruding curved portion, the sloped portion being on the side to be welded to the end portion of the one sheet.

A lap fillet arc-welded joint is produced by overlapping two metal sheets and welding an end portion of one sheet of the two metal sheets to a surface of the other sheet along the end portion of the one sheet such that a weld toe is positioned on either a top portion of a bead-like protruding curved portion that protrudes from the surface of the other sheet and extends parallel to the end portion of the one sheet or a sloped portion, on a to-be-welded side, of the protruding curved portion. Hence, because stress concentration on the weld toe is reduced, the lap fillet arc-welded joint can prevent fatigue failure from the weld toe and increase fatigue strength of a joined part joined using the lap fillet arc-welded joint.

BRIEF DESCRIPTION OF THE DRAWINGS

FIG. 1 is a cross-sectional view of a lap fillet arc-welded joint according to one example.

FIGS. 2(A) and 2(B) are cross-sectional views describing our lap fillet arc-welded joint and a conventional lap fillet arc-welded joint.

Figure 3:
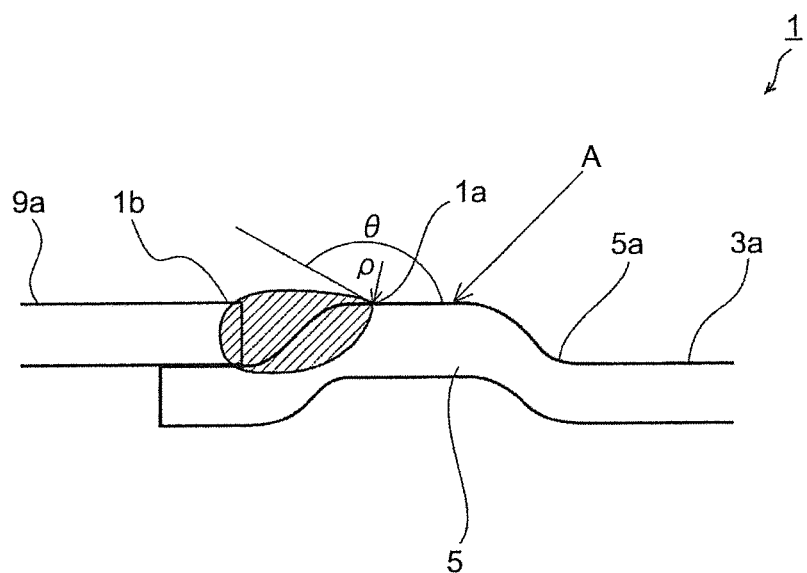
FIG. 3 is a cross-sectional view of another form of our lap fillet arc-welded joint according to one example.

REFERENCE SIGNS LIST 1 lap fillet arc-welded joint
1a weld toe (on the lower part)
1b weld toe (on the upper part)
3 lower part
3a side-wall portion
5 protruding curved portion
5a rising portion
9 upper part
9a side-wall portion
11 lap fillet arc-welded joint
11a weld toe (on the lower part)
11b weld toe (on the upper part)
13 lower part
13a side-wall portion
21 suspension arm
23 lower part
25 upper part
27 joining portion
31 lap fillet arc-welded joint
31a weld toe
31b weld toe 41 fatigue test specimen
43 steel sheet piece
45 steel sheet piece

DETAILED DESCRIPTION

First Construction

A lap fillet arc-welded joint according to one example is specifically described below. A lap fillet arc-welded joint 1 is produced by overlapping two metal sheets and linearly joining an end portion of one sheet (a side-wall portion 9a of an upper part 9) of the two metal sheets and a surface of the other part (a side-wall portion 3a of a lower part 3) along the end portion of the upper part 9 by arc welding such that a weld toe 1a is positioned on a top portion of a bead-like protruding curved portion 5 as illustrated in FIG. 1. Specifically, the bead-like protruding curved portion 5 is formed in the lap fillet arc-welded joint 1 to extend parallel to the end portion of the side-wall portion 9a of the upper part 9 and protrude from the surface, on the side to be welded to the end portion, of the side-wall portion 3a of the lower part 3.

A reason why fatigue strength of the lap fillet arc-welded joint 1 is increased by providing the protruding curved portion 5 in the lower part 3 and arc-welding the protruding curved portion 5 and the end portion of the upper part 9 together as illustrated in FIG. 1 is described below with reference to FIG. 2.

As illustrated in FIG. 2(A), in a conventional lap fillet arc-welded joint 11, a cross-sectional profile of a portion where metal sheets overlap is right-angled (dashed line in FIG. 2(A)) between a metal-sheet surface of a lower part 13 and a metal-sheet end portion of the upper part 9. The lap fillet arc-welded joint 11 between the lower part 13 and the upper part 9 has its center at the right-angled portion of the right-angular cross-sectional profile, and has a weld toe 11a on a point intersecting the metal-sheet surface of the lower part 13 and a weld toe 11b on a point intersecting the metal-sheet surface of the upper part 9.

As illustrated in FIG. 2(B), in contrast, in our lap fillet arc-welded joint 1, the weld toe 1a on the lower part 3 where the protruding curved portion 5 is formed is positioned on the top portion of the protruding curved portion 5.

A stress concentration factor $K_t$ of a stress concentrated on the lap fillet arc-welded joint 1 shaped as described above and that of the lap fillet arc-welded joint 11 shaped as described above can be calculated using Equation (1) below:

$$K_t = 1 + \left[\frac{1-\exp\left\{-0.9\sqrt{\frac{T}{h}}\cdot(\pi-\theta)\right\}}{1-\exp\left\{-0.9\sqrt{\frac{T}{h}}\cdot\left(\frac{\pi}{2}\right)\right\}}\right] \cdot \left[\tanh\left\{\frac{\left(\frac{T}{t}-1\right)^{\frac{1}{4}}}{1-\frac{\rho}{2t}}\right\}\right] \cdot \left[\frac{0.13+0.65\left(1-\frac{\rho}{2t}\right)^4}{\left(\frac{\rho}{2t}\right)^{\frac{1}{3}}}\right]. \quad (1)$$

As illustrated in FIG. 2, in Equation (1), θ is the flank angle, ρ is the radius of curvature, T is the thickness of the overlapped portion, t is the thickness of the lower sheet, and h is a weld bead height (the difference between the top portion of the weld bead and the weld toe in the sheet thickness direction). Equation (1) indicates that when the flank angle θ and the radius of curvature ρ are large, the stress concentration factor $K_t$ is small, and stress concentration is reduced.

In our lap fillet arc-welded joint 1 illustrated in FIG. 2(B), the weld toe 1a is positioned on the top portion of the protruding curved portion 5 in comparison with the lap fillet arc-welded joint 11 illustrated in FIG. 2(A). Hence, in the lap fillet arc-welded joint 1, the weld bead height h decreases and the molten metal at a weld toe 1b protrudes less. Consequently, the flank angle θ at the weld toe 1a of the lap fillet arc-welded joint 1 increases.

Furthermore, in the lap fillet arc-welded joint 1, a portion corresponding to the weld toe 11a of the conventional lap fillet arc-welded joint 11 is the weld toe 1a on the protruding curved portion 5. Hence, the lap fillet arc-welded joint 1 can reduce stress concentration on the weld toe 1a by increasing the radius of curvature ρ (see FIG. 2(B)) of the weld toe 1a and thus to increase fatigue strength.

Equation (1) indicates that the stress concentration factor $K_t$ decreases with the decrease of the weld bead height h. The weld bead height h of our lap fillet arc-welded joint 1 is considerably smaller than the weld bead height h of the conventional lap fillet arc-welded joint 11 illustrated in FIG. 2(A). Therefore, fatigue strength can be sufficiently increased.

As described above, our lap fillet arc-welded joint 1 can reduce the stress concentration factor $K_t$ to be smaller than that of the conventional lap fillet arc-welded joint 11 and thus increase fatigue strength.

The protruding curved portion 5 formed in the lower part 3 may be shaped flat at the top portion (see A in FIG. 3) as illustrated in FIG. 3. In this case, as in the lap fillet arc-welded joint 1 illustrated in FIG. 2(B), the flank angle θ and the radius of curvature ρ of the weld toe 1a on the lower part 3 can be increased to thus reduce stress concentration on the weld toe 1a. Furthermore, shaping the top portion of the protruding curved portion 5 flat as illustrated in FIG. 3 facilitates applying arc welding to position the weld toe 1a on the top portion.

Figure 4:
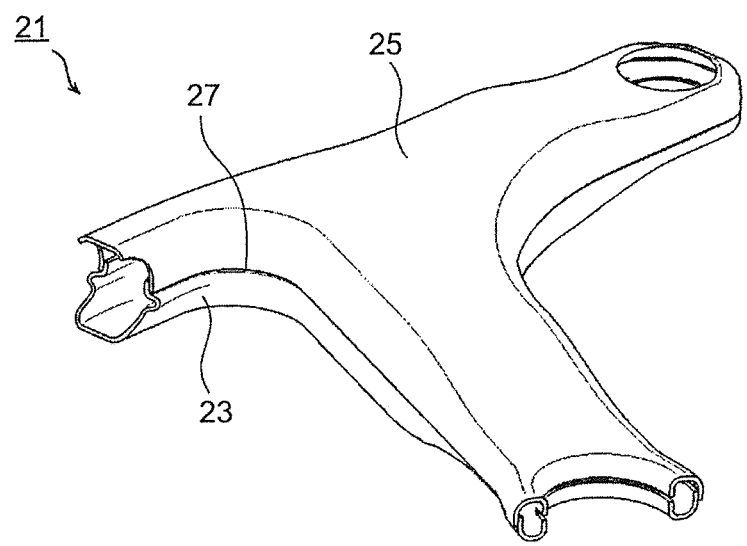
FIG. 4 is a perspective view of an automotive suspension part joined using our lap fillet arc-welded joint.

The lap fillet arc-welded joint 1 is applicable to, for instance, a suspension arm 21 illustrated in FIG. 4 or a like automotive suspension part where two metal sheets are overlapped in a manner to have an overlap width and an end portion of an upper part 25 is arc-welded to a surface of a lower part 23 along the end portion of the upper part 25.

In the suspension arm 21, a load is applied in a fore-and-aft direction of an automotive body at stoppage by braking, for instance. Fatigue strength of a joining portion 27 between the upper part 25 and the lower part 23 matters because such a load is repeatedly applied. However, the fatigue strength can be increased by joining the two parts using the lap fillet arc-welded joint 1.

Second Construction

Figure 5:
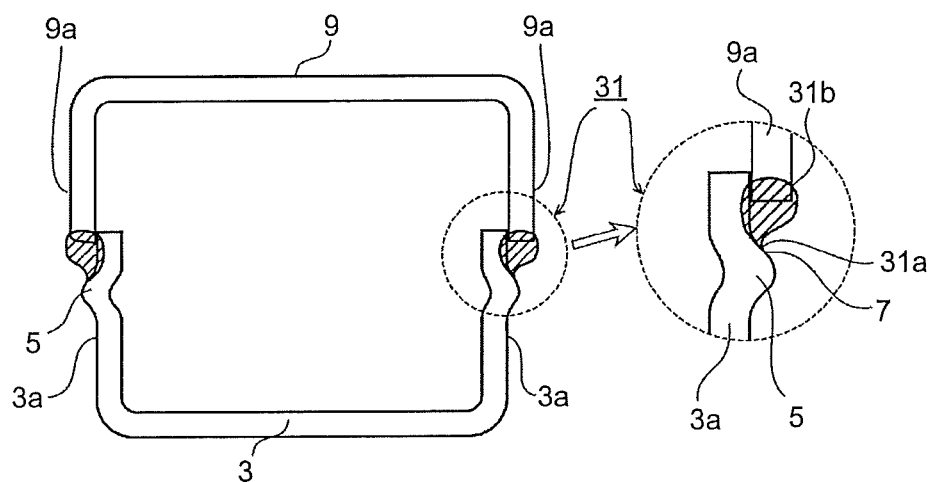
FIG. 5 is a cross-sectional view of a lap fillet arc-welded joint according to another example.
Figure 6:
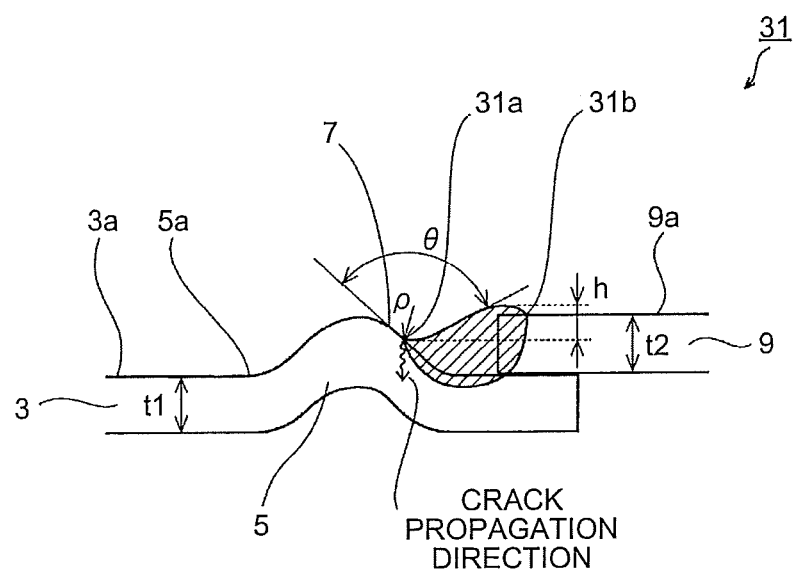
FIG. 6 is a cross-sectional view describing the lap fillet arc-welded joint according to another example.

A lap fillet arc-welded joint according to another example is specifically described below with reference to FIGS. 5 and 6. In FIGS. 5 and 6, elements identical or corresponding to those of FIG. 1 or 2 are denoted by identical reference symbols.

Our lap fillet arc-welded joint 31 is produced by linearly joining the end portion of the side-wall portion 9a of the one sheet (the upper part 9) and the surface of the side-wall portion 3a of the other sheet (the lower part 3) along the end portion such that a weld toe 31a is positioned on a sloped portion 7, on the side to be welded to the end portion of the upper part 9, of the bead-like protruding curved portion 5 as illustrated in FIG. 5. Specifically, the bead-like protruding curved portion 5 is formed in the lap fillet arc-welded joint 31 to extend parallel to the end portion of the side-wall portion 9a of the upper part 9 and protrude from the surface, on the side to be welded to the end portion, of the side-wall portion 3a of the lower part 3.

A reason why fatigue strength of the lap fillet arc-welded joint 31 is increased by providing the protruding curved portion 5 in the lower part 3 and arc-welding the end portion of the upper part 9 and the sloped portion 7 of the protruding curved portion 5 of the lower part 3 together as illustrated in FIG. 5 is described below with reference to FIG. 6.

In our lap fillet arc-welded joint 31 (see FIG. 6), the weld toe 31a on the lower part 3 where the protruding curved portion 5 is formed is positioned on the sloped portion 7, on the to-be-welded side, of the protruding curved portion 5. Such a shape can be regarded as a member having a notch in the sheet width direction and poses a necessity to take a stress concentration factor for a stress concentrated on the notch into account. This stress concentration factor $K_t$ can be calculated using Equation (2) below:

$$K_t = 1 + \left[ \frac{1 - \exp\left\{-0.9\sqrt{\frac{t_1+t_2}{h}} \cdot (\pi - \theta)\right\}}{1 - \exp\left\{-0.9\sqrt{\frac{t_1+t_2}{h}} \cdot \left(\frac{\pi}{2}\right)\right\}} \right] \cdot \left[ \frac{\left(\frac{t_2}{t_2-h} - 1\right) \cdot (t_2 - h)}{\left(4.27 \cdot \frac{t_2}{t_2-h} - 4\right) \cdot \rho} \right]^{0.83} \quad (2)$$

As illustrated in FIG. 6, in Equation (2), 0 is the flank angle, ρ is the radius of curvature, t1 is the thickness of the lower part 3, t2 is the thickness of the upper part 9, and h is the weld bead height. Equation (2) indicates that when the weld bead height h is small, the stress concentration factor $K_t$ is small, and the stress concentration is reduced.

When wettability and the amount of a molten metal remain the same, the shape of the molten metal affects the shape of the molten metal having undergone solidification. For this reason the weld bead height h of our lap fillet arc-welded joint 31 where the weld toe 31a is positioned on the sloped portion 7 as illustrated in FIG. 6 is obviously smaller than that of the conventional lap fillet arc-welded joint 11 illustrated in FIG. 2(A). Hence, our lap fillet arc-welded joint 31 reduces the stress concentration factor $K_t$ to be smaller than that of the conventional lap fillet arc-welded joint 11 to thus reduce stress concentration and thereby increase fatigue strength.

The conventional lap fillet arc-welded joint 11 has a problem of being prone to welding irregularities in the welding direction of arc welding and prone to fatigue failure originating from a portion where shortage of molten metal occurs, which induces a desire for a method that enables welding uniform in the welding direction.

As illustrated in FIG. 2(A), in the conventional lap fillet arc-welded joint 11, an area to be welded is a center (corner portion) of the right-angle portion where the end portion of the side-wall portion 9a of the upper part 9 intersects the surface of a side-wall portion 13a of the lower part 13. Accordingly, the weld toe 11a is on the point where the molten metal intersects the surface of the lower part 13; the weld toe 11b is on the point where the molten metal intersects the surface of the upper part 9. Hence, the molten metal is likely to be pulled by the gravitational force to flow to the surface of the lower part 13, and a slight variation in welding conditions or surface condition of the metal sheet can change wettability of the molten metal, making welding irregularities more likely to occur.

In contrast, as illustrated in FIG. 6, the weld toe 31a, which is one of the weld toes, is positioned on the sloped portion 7 of the lower part 3 and a weld toe 31b, which is the other weld toe, is positioned on the surface of the upper part 9; consequently, a groove shape is formed by the sloped portion 7 of the lower part 3 and the end portion of the upper part 9. Because arc welding is applied along this groove shape, even if there is some variation in the welding conditions or the surface condition of the metal sheet, the gravitational force pulls the molten metal, causing the molten metal per se to eliminate welding irregularities. Hence, our lap fillet arc-welded joint 31 is less prone to welding irregularities and enables stable welding, which results in an increase in fatigue strength. The same holds true with the structure where the weld toe 1a is positioned on the top portion of the protruding curved portion 5 as illustrated in FIG. 2(B), and such a structure is less prone to welding irregularities and enables stable welding.

When a repeated stress is applied to a lap fillet arc-welded joint in a direction parallel to the surface of the sheet, fatigue failure is typically likely to develop from a weld toe, with a crack propagating substantially in the sheet thickness direction. In the conventional lap fillet arc-welded joint 11 (see FIG. 2(A)) and the lap fillet arc-welded joint 31 (see FIGS. 5 and 6) where the sloped portion 7 is provided for welding, the weld toe 11b and the weld toe 31b, each being one of the weld toes, are both at the point where the molten metal intersects the surface of the metal sheet of the upper part 9 and are identically positioned.

However, in the conventional lap fillet arc-welded joint 11, the weld toe 11a, which is the other weld toe, is on the surface of the lower part 3 (see FIG. 2(A)). Hence, with conventional lap fillet welding, because a crack propagation direction, which is substantially perpendicular to the surface of the lower part 3, is substantially perpendicular to the direction in which the repeated fatigue stress is applied (in the direction parallel to the surface of the lower part 3), a propagation length of the crack is short.

In our lap fillet arc-welded joint 31, in contrast, the sloped portion 7 is on the surface of the lower part 3 (see FIGS. 5 and 6), and a crack propagates substantially parallel to the sheet thickness direction of the upper part 9. Hence, in the lap fillet arc-welded joint 31, because the crack in the sloped portion 7 propagates obliquely with respect to the sheet thickness direction, a propagation length is larger than that of the conventional lap fillet arc-welded joint 11. Consequently, our lap fillet arc-welded joint 31 is enhanced in terms of fatigue life compared to the conventional lap fillet arc-welded joint 11.

Fatigue strength of a joined part such as the suspension arm 21 illustrated in FIG. 4, obtained by arc welding two parts that are fit in in a manner to have an overlap width can be increased by applying the lap fillet arc-welded joint 31 according to the second example to the joining portion 27 between the end portion of the wall portion of the upper part 25 and the lower part 23 as in the first example.

Example 1

We conducted an experiment. Details of the experiment are described below. In Example 1, a basic fatigue test was conducted using fatigue test specimens made of two steel sheets joined using our lap fillet arc-welded joint 1 (see FIG.

2(B)) or the conventional lap fillet arc-welded joint 11 (see FIG. 2(A)) to evaluate fatigue strength of each fatigue test specimen.

The fatigue test specimens were prepared from a sample, which was a 780-MPa-class hot-rolled steel sheet having a sheet thickness t of 2.6 mm, by the procedure described below. First, a plurality of steel sheet pieces each measuring 300 mm×100 mm was cut from the sample. The bead-like protruding curved portion 5 extending parallel to an end portion on the long side (300 mm) was formed in the cut steel sheet piece.

Figure 7:
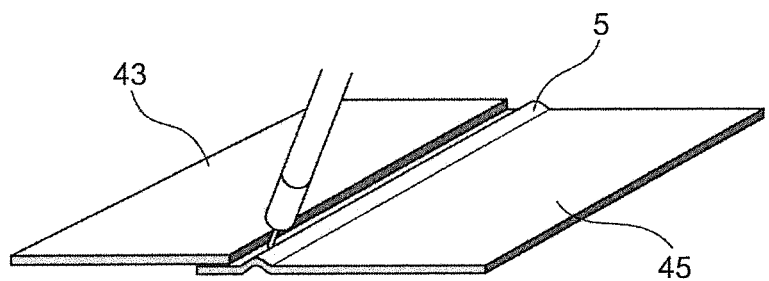
FIG. 7 is an explanatory diagram of a welding method of Examples 1 and 2.
Figure 8:
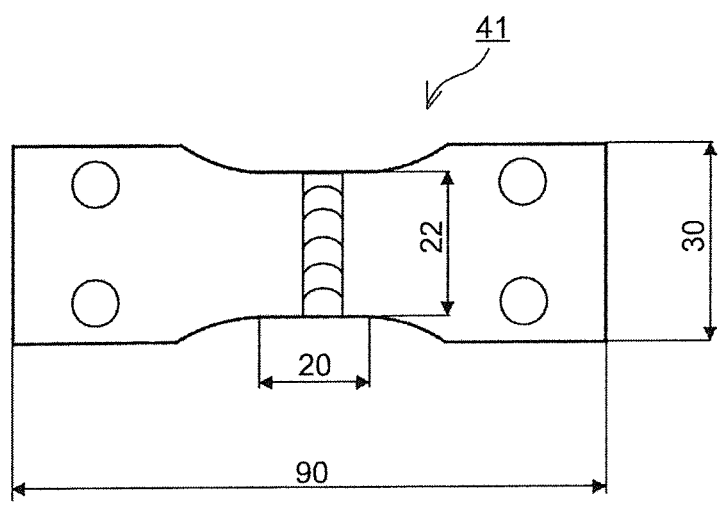
FIG. 8 is an explanatory diagram of the shape of a fatigue test specimen for a plane bending fatigue test of Examples 1 and 2.

Next, as illustrated in FIG. 7, a test body joined using our lap fillet arc-welded joint 1 (see FIG. 2(A)) was prepared by overlapping a steel sheet piece 43, which was the cut steel sheet piece, with a steel sheet piece 45, which was the cut steel sheet piece where the bead-like protruding curved portion 5 was formed, and applying arc welding along an end portion of the steel sheet piece 43. A fatigue test specimen 41 shaped as illustrated in FIG. 8 was obtained from the prepared test body, and the fatigue test was conducted.

As welding conditions, a welding current of 180 A, a voltage of 22.5 V, a torch speed of 80 cm/min, and a shielding gas of Ar-20% $CO_2$ were used; and a 1.2-mm-diameter 780-MPa-class high-strength steel was used as a welding wire.

Figure 9:
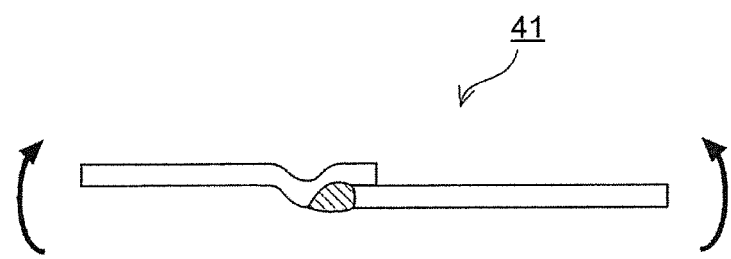
FIG. 9 is an explanatory diagram of a fatigue test method of Examples 1 and 2.

The fatigue test was conducted by pulsating plane bending the fatigue test specimen 41 placed on a test apparatus such that a weld bead of the fatigue test specimen 41 faced downward. Specifically, the fatigue test specimen 41 was placed such that its upper sheet was fixed to a drive arm side of the test apparatus and its lower sheet was fixed to a measuring swing arm side of the test apparatus and that a bending neutral plane was at a sheet thickness center of the lower sheet. A repeated load was applied as illustrated in FIG. 9 via the drive arm to apply a target stress to the fatigue test specimen 41. The test was conducted until the fatigue test specimen 41 was cracked. The stress applied to the fatigue test specimen 41 was determined from a moment measured via the measuring swing arm, and a sheet thickness and a sheet width (average values of the upper sheet and the lower sheet) of the fatigue test specimen 41. Fatigue test conditions were a stress ratio of 0 (pulsating) and a test frequency of 20 Hz. The fatigue test was terminated when the number of cycles reached its maximum value, ten million.

Similarly, as a Comparative Example, a test body joined using the conventional lap fillet arc-welded joint 11 (see FIG. 2(A)) was prepared by overlapping two steel sheet pieces cut from the sample and linearly joining an end portion of one steel sheet piece to a surface of the other steel sheet piece by arc welding. A fatigue test specimen was obtained from the prepared test body, and the fatigue test was conducted. Welding conditions and fatigue test conditions similar to those of the fatigue test specimen 41 were used in the Comparative Example.

Figure 10:
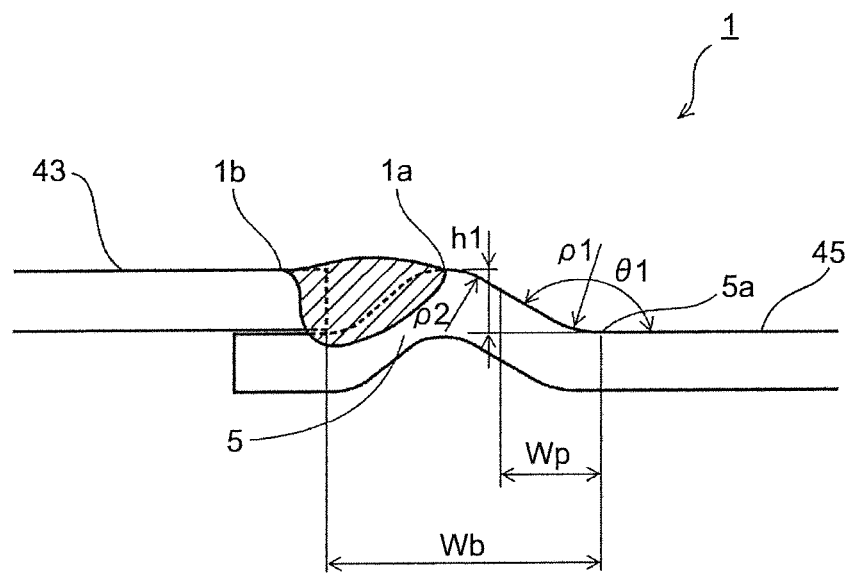
FIG. 10 is an explanatory diagram of the shape of a protruding curved portion of Example 1.

In Example 1, fatigue strength of our lap fillet arc-welded joint 1 was studied by changing the shape of the protruding curved portion 5 illustrated in FIG. 10. The shape of the protruding curved portion 5 was defined as illustrated in FIG. 10 with the height h1 of the protruding curved portion 5, the radius ρ1 of curvature of a rising portion 5a on the not-to-be-welded side of the protruding curved portion 5, the rising angle θ1 of the rising portion 5a, the radius ρ2 of curvature of the top portion on the not-to-be-welded side, the width Wp between a portion where curvature of the top portion ends and the rising portion 5a, and the width Wb of the protruding curved portion 5. Shapes of the bead-like protruding curved portion 5 formed by press forming are presented in Table 1.

TABLE 1

| No. | h1 (mm) | ρ1 (mm) | θ1 (mm) | ρ2 (mm) | Wb (mm) | Wp (mm) | Remark |
|---|---|---|---|---|---|---|---|
| 1 | 2.0 | 0.8 | 150 | 1.0 | 10.9 | 3.9 | Example |
| 2 | 2.3 | 0.8 | 150 | 1.0 | 11.9 | 4.5 | Example |
| 3 | 2.6 | 0.8 | 150 | 1.0 | 13.0 | 5.0 | Example |
| 4 | 2.6 | 1.0 | 150 | 1.0 | 13.1 | 5.0 | Example |
| 5 | 2.6 | 1.6 | 150 | 1.0 | 13.4 | 5.2 | Example |
| 6 | 2.6 | 2.0 | 150 | 1.0 | 13.6 | 5.3 | Example |
| 7 | 2.6 | 0.8 | 125 | 1.0 | 8.5 | 2.8 | Example |
| 8 | 2.6 | 0.8 | 150 | 2.0 | 13.5 | 5.3 | Example |
| 9 | 2.6 | 0.5 | 150 | 1.0 | 12.8 | 4.9 | Example |
| 10 | — | — | — | — | — | — | Comparative Example |

The Comparative Example (No. 10) in Table 1 is a fatigue test specimen including the conventional lap fillet arc-welded joint 11 illustrated in FIG. 2(A).

Figure 11:
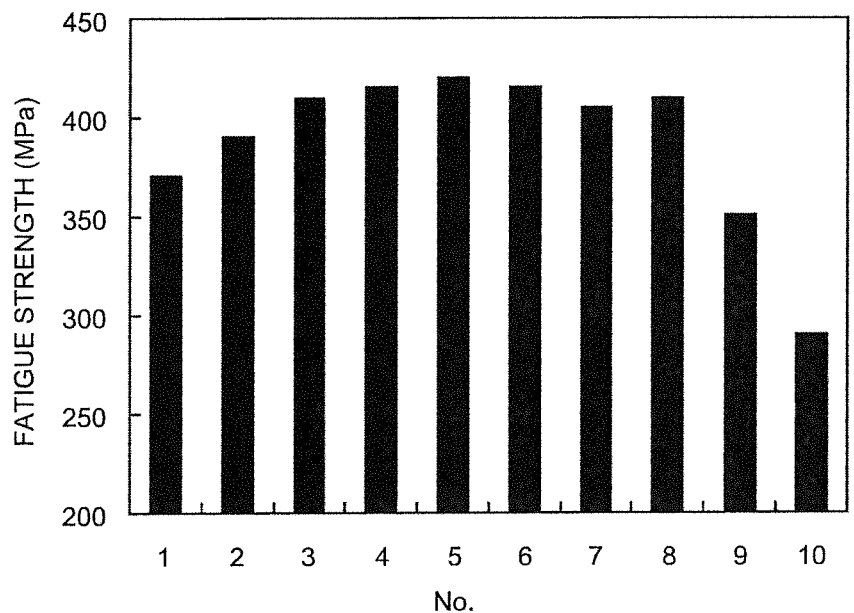
FIG. 11 is a diagram of a fatigue test result of Example 1.

FIG. 11 illustrates a result of a fatigue strength (stress amplitude) test of three million cycles. The result indicates that each of No. 1 to No. 9, each being our Example, was increased in fatigue strength compared to the Comparative Example No. 10, which was the conventional lap fillet arc-welded joint 11. In Nos. 1, 2, 4, 5, and 6 of our Examples, a fatigue crack developed in the weld toe 1a, while a fatigue crack developed in the rising portion 5a of the protruding curved portion 5 in Nos. 3, 7, 8, and 9.

In No. 1 to No. 3 that differed in the height h1 of the protruding curved portion 5, stress concentration on the weld toe 1a decreased and fatigue strength increased with the increase of the height h1. In No. 3 that is the highest of No. 1 to No. 3 of our Examples in terms of the height h1 of the protruding curved portion 5, a fatigue crack did not develop in the weld toe 1a, but a fatigue crack was caused by stress concentration on the rising portion 5a of the protruding curved portion 5.

In No. 4 to No. 6 that differed in the radius of curvature ρ1 of the rising portion 5a of the protruding curved portion 5, stress concentration on the rising portion 5a decreased with the increase of the radius of curvature ρ1, and a fatigue crack developed in the weld toe 1a. No. 4 to No. 6 are identical to No. 3 where stress concentration on the weld toe 1a is low in terms of the height h1 of the protruding curved portion 5. Hence, each of No. 4 to No. 6, where stress concentration on the weld toe 1a was low, exhibited favorable fatigue strength.

The radii of curvature ρ1 of the rising portion 5a of No. 4 to No. 6 are larger than the radius of curvature ρ1, which is 0.8 mm, of No. 1 to No. 3. Favorable fatigue strength was thus obtained when the radius of curvature ρ1 was larger than or equal to 0.8 mm. A fatigue crack in No. 9 developed from the rising portion 5a of the protruding curved portion 5 because No. 9 had a favorable condition in terms of the height h1. Hence, in spite of having the radius of curvature ρ1 of 0.5 mm, which was low, No. 9 exhibited fatigue strength higher than that of the Comparative Example (No. 10) of the conventional lap fillet arc-welded joint.

Both No. 7 that differed in the rising angle θ1 of the rising portion 5a of the protruding curved portion 5 and No. 8 that differed in the radius of curvature ρ2 of the top portion on the not-to-be-welded side exhibited favorable fatigue strength because the position where a fatigue crack developed was the rising portion 5a of the protruding curved portion 5.

Thus, we demonstrated that fatigue strength is increased by welding an end portion of one sheet of to-be-joined two metal sheets to a surface of the other sheet along the end portion of the one sheet such that a weld toe is positioned on a top portion of a bead-like protruding curved portion that extends parallel to the end portion of the one sheet and protrudes from the surface of the other sheet.

Example 2

In Example 2, a basic fatigue test was conducted using fatigue test specimens each joined using our lap fillet arc-welded joint 31 illustrated in FIG. 12(A) to evaluate fatigue strength of the fatigue test specimens.

As in Example 1, the fatigue test specimens each joined using our lap fillet arc-welded joint 31 were prepared from a sample, which was a 780-MPa-class hot-rolled steel sheet having the sheet thickness t of 2.6 mm, by the procedure described below. First, a plurality of steel sheet pieces each measuring 300 mm×100 mm was cut from the sample. A steel sheet piece was formed by bending the cut steel sheet piece using a bender to form the bead-like protruding curved portion 5 extending parallel to an end portion on the long side (300 mm).

Next, as illustrated in FIG. 7, a test body joined using our lap fillet arc-welded joint was prepared by overlapping the cut steel sheet piece 43 and the cut steel sheet piece 45 where the bead-like protruding curved portion 5 was formed and applying arc welding along an end portion of the steel sheet piece 43 such that the weld toe 31a, which is one of weld toes, is positioned on the sloped portion 7 on the to-be-welded side of the protruding curved portion 5. A fatigue test specimen of the same shape as the fatigue test specimen 41 illustrated in FIG. 8 was obtained from the prepared test body.

Similarly, as a Comparative Example, a test body joined using the conventional lap fillet arc-welded joint 11 (see FIG. 12(B)) was prepared by overlapping two steel sheet pieces cut from the sample and linearly joining the steel sheet pieces by arc welding an end portion of one steel sheet piece to a surface of the other steel sheet piece. A fatigue test specimen of the same shape as the fatigue test specimen 41 illustrated in FIG. 8 was obtained from the prepared test body.

Figure 12:
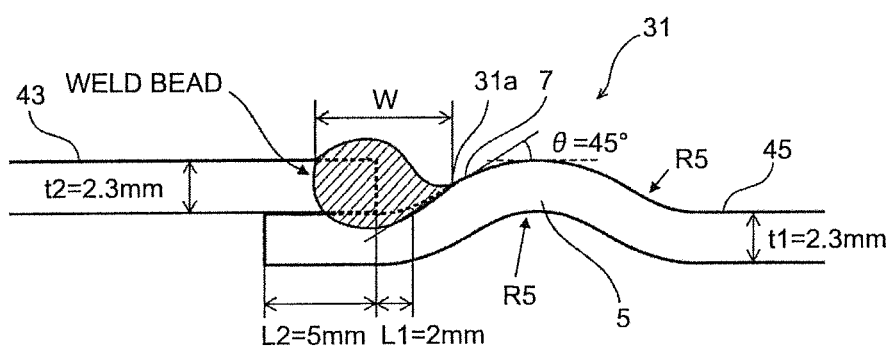
FIGS. 12(A) and 12(B) are explanatory diagrams of shapes of the lap fillet arc-welded joints of Example 2.
Figure 12:
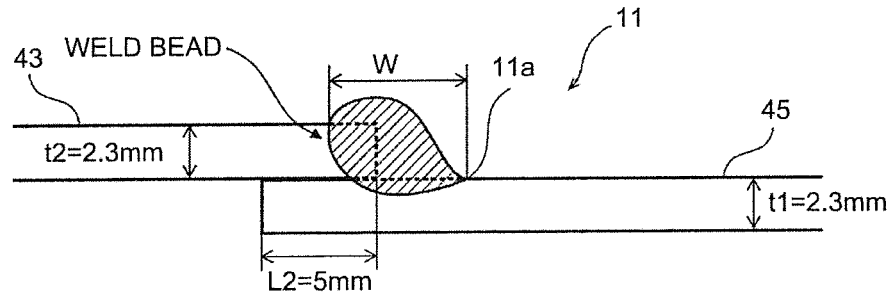

A cross-sectional view of a weld bead and its surroundings of the fatigue test specimen of our Example (see FIG. 12(A)) and that of the fatigue test specimen of the Comparative Example (see FIG. 12(B)) are illustrated in FIG. 12. In the fatigue test specimen of our Example illustrated in FIG. 12(A), the height (depth) D of the sloped portion 7 provided by the formed protruding curved portion 5 was 2.3 mm which was equal to the sheet thickness t2 of the sample; the angle θ of slope of the sloped portion 7 formed by the protruding curved portion 5 was 45°; the distance L1 between the end portion of the steel sheet piece 43 and the rising portion 5a of the protruding curved portion 5 of the steel sheet piece 45 was 2 mm; and the overlap width L2 of the steel sheet piece 43 and the steel sheet piece 45 was 5 mm. Also, in the fatigue test specimen of the Comparative Example illustrated in FIG. 12(B), the steel sheet piece 43 and the steel sheet piece 45 had the overlap width L2 of 5 mm. Our Example and the Comparative Example were formed to be identical in the weld bead width W, which was either 5.5 mm or 7 mm.

In both our Example and the Comparative Example, as arc welding conditions, a welding current of 185 A or 205 A, a voltage of 19 V or 23 V, a welding speed of 85 cm/min, and a shielding gas of Ar-20% $CO_2$ were used; and a 1.2-mm-diameter 780-MPa-class high-strength steel was used as a welding wire. The arc welding conditions are presented in Table 2.

TABLE 2

| | Arc Welding Conditions | | | | Fatigue Test | | |
| --- | --- | --- | --- | --- | --- | --- | --- |
| No. | Current (A) | Voltage (V) | Speed (cm/min) | Welding Wire | Weld bead width W (mm) | Target stress (MPa) | Number of cycles | Remark |
| 1 | 205 | 23 | 85 | 780-MPa-class high strength steel | 7 | 600 | 69400 | Comparative Example |
| 2 | | | | | | 500 | 136500 | Comparative Example |
| 3 | | | | | | 400 | 613300 | Comparative Example |
| 4 | 205 | 23 | 85 | 780-MPa-class high strength steel | 7 | 600 | 149900 | Example |
| 5 | | | | | | 500 | 565700 | Example |
| 6 | | | | | | 450 | 1400000 | Example |
| 7 | | | | | | 400 | 10000000 (not broken) | Example |
| 8 | 185 | 19 | 85 | 780-MPa-class high strength steel | 5.5 | 500 | 130600 | Comparative Example |
| 9 | | | | | | 400 | 330300 | Comparative Example |
| 10 | | | | | | 300 | 10000000 (not broken) | Comparative Example |
| 11 | 158 | 19 | 85 | 780-MPa-class high strength steel | 5.5 | 600 | 188300 | Example |
| 12 | | | | | | 500 | 826200 | Example |
| 13 | | | | | | 400 | 10000000 (not broken) | Example |

As in Example 1, the fatigue test was conducted by pulsating plane bending the fatigue test specimen placed on the test apparatus such that the weld bead of the fatigue test specimen faced downward. Specifically, the fatigue test specimen 41 was placed such that its upper sheet was fixed to the drive arm side of the test apparatus and its lower sheet was fixed to the measuring swing arm side of the test apparatus and that a bending neutral plane was at a sheet thickness center of the lower sheet. A repeated load was applied via the drive arm to apply a target stress to the fatigue test specimen 41. The test was conducted until the fatigue test specimen 41 was cracked (see FIG. 9). The stress applied to the fatigue test specimen 41 was determined from a moment measured via the measuring swing arm, and a sheet thickness and a sheet width (average values of the upper sheet and the lower sheet) of the fatigue test specimen 41. Fatigue test conditions were a stress ratio of 0 (pulsating) and a test frequency of 20 Hz. The fatigue test was terminated when the number of cycles reached its maximum value, ten million.

A result of the fatigue test is presented in Table 2 above. As described above, our Example is a test result of the fatigue test specimen joined using the lap fillet arc-welded joint where the weld toe is on the sloped portion illustrated in FIG. 12(A). The Comparative Example is a test result of the fatigue test specimen joined using the conventional lap fillet arc-welded joint illustrated in FIG. 12(B). Referring to Table 2, comparison on a target-stress-by-target-stress basis indicates that fatigue life of our Example is considerably longer than that of the Comparative Example irrespective of the welding conditions.

INDUSTRIAL APPLICABILITY

Our lap joints allow increasing fatigue strength of joined parts joined using a lap fillet arc-welded joint and, therefore, is applicable to a lap fillet arc-welded joint.

The invention claimed is:

1. An automotive suspension part comprising an upper part and a lower part having corresponding substantially planar sidewall portions joined using a lap fillet arc-welded joint, wherein the lap fillet arc-welded joint is produced by overlapping two metal sheets defining the corresponding sidewall portions and welding a flat end surface of an upper sheet of the two metal sheets to an outer surface of a lower sheet of the two metal sheets along the end surface of the upper sheet to form an overlapped portion, the lap fillet arc-welded joint comprising:
    an outwardly bent protruding curved portion extending across the lower sheet offset from an end surface thereof, the protruding curved portion being bead-shaped and protruding from the outer surface of the lower sheet to form a top surface;
    a weld bead extending along the end surface of upper sheet, the weld bead having a weld toe positioned on a sloped portion of the protruding curved portion and a weld toe positioned on an outer surface of the upper sheet, the sloped portion being on an end surface side of the protruding curved portion to be welded to the end surface of the upper sheet, and the weld bead having a top surface; and
    a notch formed between the top surface of the protruding curved portion and the top surface of the weld bead;
    wherein a stress concentration factor $K_t$ of the lap fillet arc-welded joint is defined by the following Equation:

$$K_t = 1 + \left[ \frac{1 - \exp\left\{-0.9\sqrt{\frac{t_1+t_2}{h}} \cdot (\pi - \theta)\right\}}{1 - \exp\left\{-0.9\sqrt{\frac{t_1+t_2}{h}} \cdot \left(\frac{\pi}{2}\right)\right\}} \right] \cdot \left[ \frac{\left(\frac{t_2}{t_2-h} - 1\right) \cdot (t_2 - h)}{\left(4.27 \cdot \frac{t_2}{t_2-h} - 4\right) \cdot \rho} \right]^{0.83}$$

wherein $\Theta$ is a flank angle between the weld bead and the sloped portion of the protruding curved portion, $\rho$ is a radius of curvature of the weld toe positioned on the sloped portion of the protruding curved portion, $t_1$ is a thickness of the lower sheet, $t_2$ is the thickness of the upper sheet, and h is a weld bead height defined by the difference between the top surface of the weld bead and the weld toe positioned on the sloped portion of the protruding curved portion in a sheet thickness direction.

* * * * *